(12) United States Patent  
Suyama

(10) Patent No.: US 8,764,356 B2
(45) Date of Patent: Jul. 1, 2014

(54) DUST COLLECTING CASE AND CUTTING MACHINE EQUIPPED THEREWITH

(75) Inventor: Akihiro Suyama, Hamamatsu (JP)

(73) Assignee: Roland DG Corporation, Hamamatsu-Shi, Shizuoka-Ken (JP)

(*) Notice: Subject to any disclaimer, the term of this patent is extended or adjusted under 35 U.S.C. 154(b) by 542 days.

(21) Appl. No.: 13/211,189

(22) Filed: Aug. 16, 2011

(65) Prior Publication Data

US 2012/0076601 A1    Mar. 29, 2012

(30) Foreign Application Priority Data

Sep. 24, 2010 (JP) ................................. 2010-213571

(51) Int. Cl.
*B23Q 11/00* (2006.01)
*B23Q 1/54* (2006.01)
*B23Q 1/52* (2006.01)

(52) U.S. Cl.
CPC ........ *B23Q 11/0046* (2013.01); *B23Q 11/0053* (2013.01); *B23Q 1/5406* (2013.01); *B23Q 1/525* (2013.01)
USPC ........... 409/137; 409/198; 409/221; 409/224; 408/67

(58) Field of Classification Search
CPC .......... B23Q 11/0046; B23Q 11/0042; B23Q 11/0057; B23Q 11/0053; B23Q 16/02; B23Q 16/022
USPC ......... 408/67, 89; 409/134, 137, 198; 269/58, 269/71, 73, 80; 74/813 R
See application file for complete search history.

(56) References Cited

U.S. PATENT DOCUMENTS

| | | | | |
|---|---|---|---|---|
| 2,144,586 | A * | 1/1939 | Kelley | 175/71 |
| 5,069,695 | A * | 12/1991 | Austin | 55/385.1 |
| 5,522,683 | A * | 6/1996 | Kakimoto et al. | 408/13 |
| 6,682,276 | B2 * | 1/2004 | Harami et al. | 409/134 |
| 6,884,009 | B2 * | 4/2005 | Maeda | 409/134 |
| 7,645,103 | B2 * | 1/2010 | Schmidt et al. | 409/168 |
| 8,333,536 | B2 * | 12/2012 | Shih | 409/137 |
| 8,562,497 | B2 * | 10/2013 | Tanizaki et al. | 483/3 |

* cited by examiner

*Primary Examiner* — Andrea Wellington
*Assistant Examiner* — Nicole N Ramos
(74) *Attorney, Agent, or Firm* — Lee, Hong, Degerman, Kang & Waimey

(57) ABSTRACT

A dust collecting case provided on a cutting machine for cutting a target object includes an outer case member and an inner case member. The outer case member includes a bottom plate, a first side member extending from a peripheral edge of the bottom plate, and a suction port. The inner case member includes a second side member positioned inside the first side member, and an upper member provided between an upper portion of the first side member and an upper portion of the second side member such that the upper member closes from above a space surrounded by the first side member and the second side member. The second side member includes an inner peripheral surface that faces and surrounds an outer periphery of the target object. A gap is located in between an outer surface of the second side member and an inner surface of the first side member.

19 Claims, 5 Drawing Sheets

DUST COLLECTING CASE AND CUTTING MACHINE EQUIPPED THEREWITH

CROSS-REFERENCE TO RELATED APPLICATIONS

Pursuant to 35 U.S.C. §119(a), this application claims the benefit of earlier filing date and right of priority to Japanese Application No. 2010-213571, filed on Sep. 24, 2010, the contents of which are hereby incorporated by reference herein in its entirety.

FIELD OF THE INVENTION

The present invention relates to a dust collecting case provided on a cutting machine for performing cutting work on a target object.

BACKGROUND OF THE INVENTION

In cutting machines that cut work pieces with a rotating cutting tool, debris such as cutting chips are generated as a result of the cutting. Conventional cutting machines have been equipped with a dust collecting case and a dust collecting device for suctioning air inside the dust collecting case to suction and remove such cutting chips.

FIGS. 1 and 2 are schematic diagrams showing configurations of conventional dust collecting cases. A dust collecting case 100 shown in FIG. 1 is provided with a case main body 101 that covers the periphery of a work piece 105. The case main body 101 includes an air flow path 102 connected to a dust collecting device, not shown. Referring to FIG. 2, a dust collecting case 110 is provided with a case main body 111 that covers the periphery of a tool 104. The case main body 111 includes an air flow path 112 connected to a dust collecting device, not shown.

In the conventional dust collecting case 100 shown in FIG. 1, the case main body 101 covers the entire periphery of the work piece 105 and is relatively large in size. As a result, although suctioning air near a suction port 103 is relatively easy, suctioning air in locations away from the suction port 103 is more difficult. This causes difficulty in suctioning and removing cutting chips when the tool 104 is in a location away from the suction port 103.

In the conventional dust collecting case 110 shown in FIG. 2, the case main body 111 covers the periphery of the tool 104. Consequently, unless utmost care is taken with respect to relative movements of the tool 104 and the work piece 105, problems arise from the tool 104 interfering with the case main body 111.

In view of the problems associated with the conventional dust collecting cases, the objective of the present invention is to provide a dust collecting case that can fully suction and remove cutting chips generated at locations away from a suction port while easily avoiding interference with a tool, and a cutting machine equipped therewith.

SUMMARY OF THE INVENTION

The present invention is directed to a dust collecting case that can fully suction and remove cutting chips generated at locations away from a suction port while readily avoiding interference with a cutting tool, and a cutting machine equipped therewith.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a dust collecting case provided on a cutting machine for performing cutting work on a target object, the dust collecting case comprising an outer case member including a bottom plate, a first side member extending upward from a peripheral edge of the bottom plate, and a suction port connected to a dust collecting device; and an inner case member including a second side member positioned inside the first side member, and an upper member provided between an upper portion of the first side member and an upper portion of the second side member such that the upper member closes from above a space surrounded by the first side member and the second side member. The second side member includes an inner peripheral surface that faces and surrounds an outer periphery of the target object, and a gap is located in between an outer surface of the second side member and an inner surface of the first side member. In an embodiment, the second side member comprises a tubular shape.

In one embodiment of the invention, a horizontal position of a lower end of the second side member is lower than a horizontal position of a lower end of the target object. In another embodiment of the invention, the suction port is formed in the first side member and a horizontal position of a lower end of the second side member is lower than a horizontal position of an upper portion of the suction port. In a further embodiment of the invention, the inner case member includes a third side member rising upward from an outer periphery of the upper member.

In yet another embodiment of the invention, the target object comprises a work piece to be cut and a holder to retain the work piece to be cut. The first side member and the second side member define a through hole for passing a first horizontal rotary shaft that rotatably supports the holder. The suction port is formed at a position offset from the through hole in the first side member.

In yet a further embodiment of the invention, a second horizontal rotary shaft is attached to the outer case member, the second horizontal rotary shaft extending in a direction orthogonal to the first horizontal rotary shaft. Moreover, the suction port is formed at a position offset from the second horizontal rotary shaft in the first side member.

In accordance with another embodiment of the invention, a cutting machine for performing work on a work piece comprises a cutting tool cutting a work piece; a cutting head driving the cutting tool; a holder holding the work piece; a dust collecting case covering bottom and side surfaces of the work piece and the holder; and a main body case housing the cutting tool, the cutting head, the holder, the work piece and the dust collecting case, wherein the dust collecting case comprises an outer case member including a bottom plate, a first side member extending upward from a peripheral edge of the bottom plate, and a suction port connected to a dust collecting device, and an inner case member including a second side member positioned inside the first side member, and an upper member provided between an upper portion of the first side member and an upper portion of the second side member such that the upper member closes from above a space surrounded by the first side member and the second side member, wherein the second side member includes an inner peripheral surface that faces and surrounds an outer periphery of a target object, the target object comprising the holder and the work piece, and wherein a gap is located in between an outer surface of the second side member and an inner surface of the first side member.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to a dust collecting case provided on a cutting machine for performing cutting work on a target object.

Figure 3:
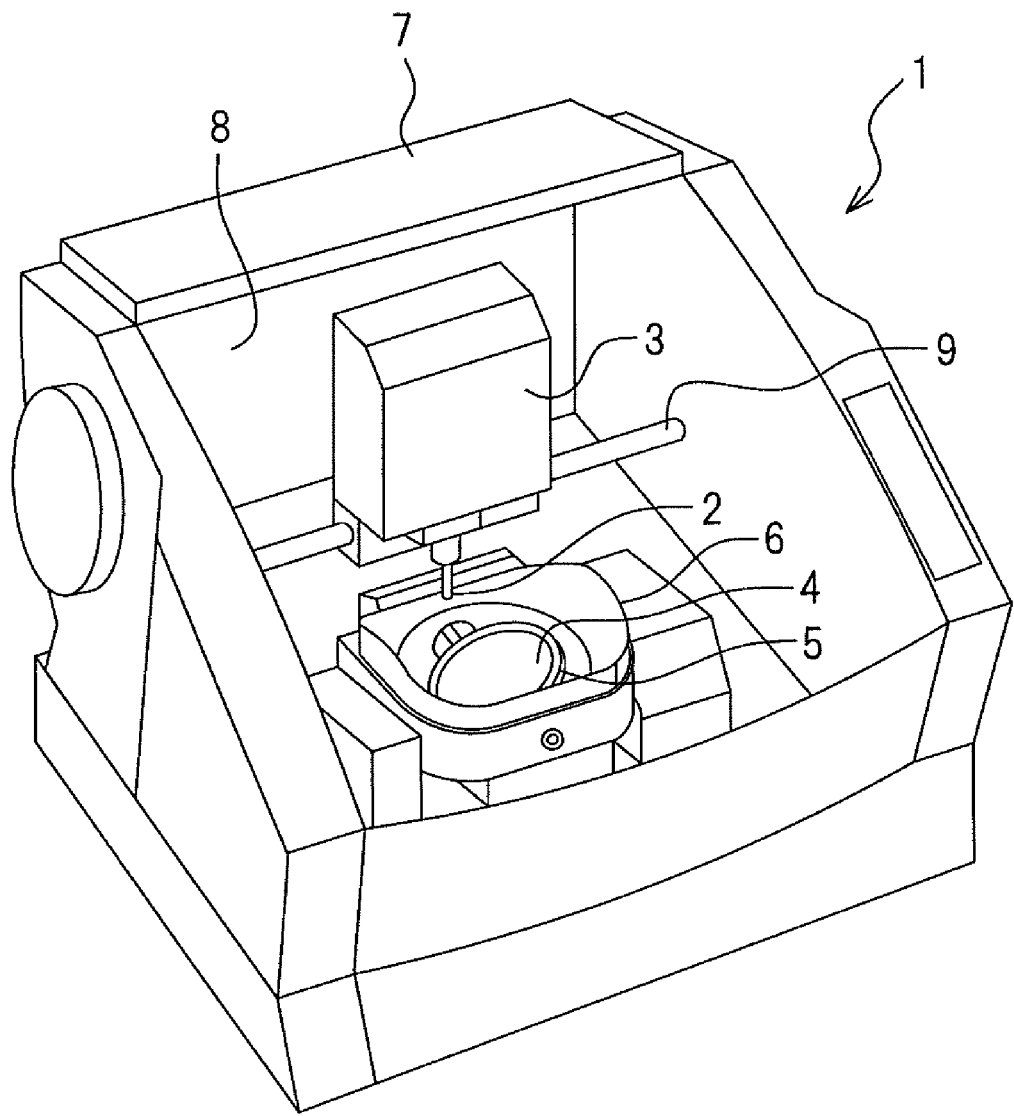
FIG. 3 is a perspective view of a cutting machine in accordance with an embodiment of the present invention.

Referring to FIG. 3, a cutting machine 1 according to an embodiment of the invention is provided with a cutting tool (hereinafter "tool") 2, a cutting head 3 for driving the cutting tool 2 and a holder 5 for holding a work piece 4. The work piece 4 represents an item to be cut by the cutting machine 1. The cutting machine 1 also includes a dust collecting case 6 covering bottom and side surfaces of the work piece 4 and the holder 5. A main body case 7 of the cutting machine 1 houses the cutting tool 2, the cutting head 3, the work piece 4, the holder 5, the dust collecting case 6 and other components of the cutting machine 1.

An opening 8 is formed on an upper side towards the front of the main body case 7. Although not shown, a clear cover may be provided on the main body case 7 to cover the opening 8. A user of the cutting machine 1 is able to see a cutting process occurring within the main body case 7 through the clear cover. User tasks, such as replacing the tool 2 or setting the work piece 4, and the like, are performed through the opening 8. The clear cover is formed to be freely opened/closed, or attached to the main body 7 in a freely detachable manner so as to allow the opening 8 to expose the components housed in the cutting machine 1.

The cutting head 3 moves appropriately in the lateral direction as it rotates the tool 2. A motor, not shown, is housed within the cutting head 3 for rotating the tool 2. The cutting head 3 engages a laterally extending guide rail 9. The cutting head 3 moves laterally along the guide rail 9 based on the driving force of the motor.

Figure 4:
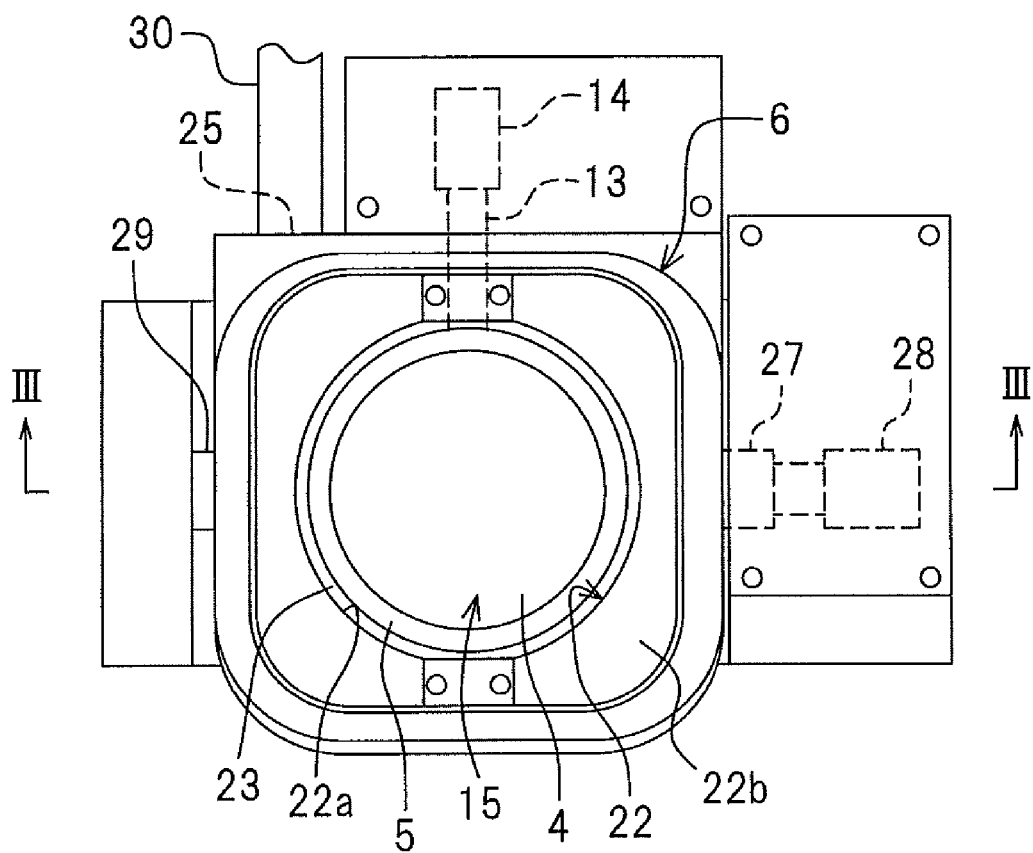
FIG. 4 is a plan view of a cutting machine including a dust collecting case and an item to be processed in accordance with an embodiment of the present invention.
Figure 5:
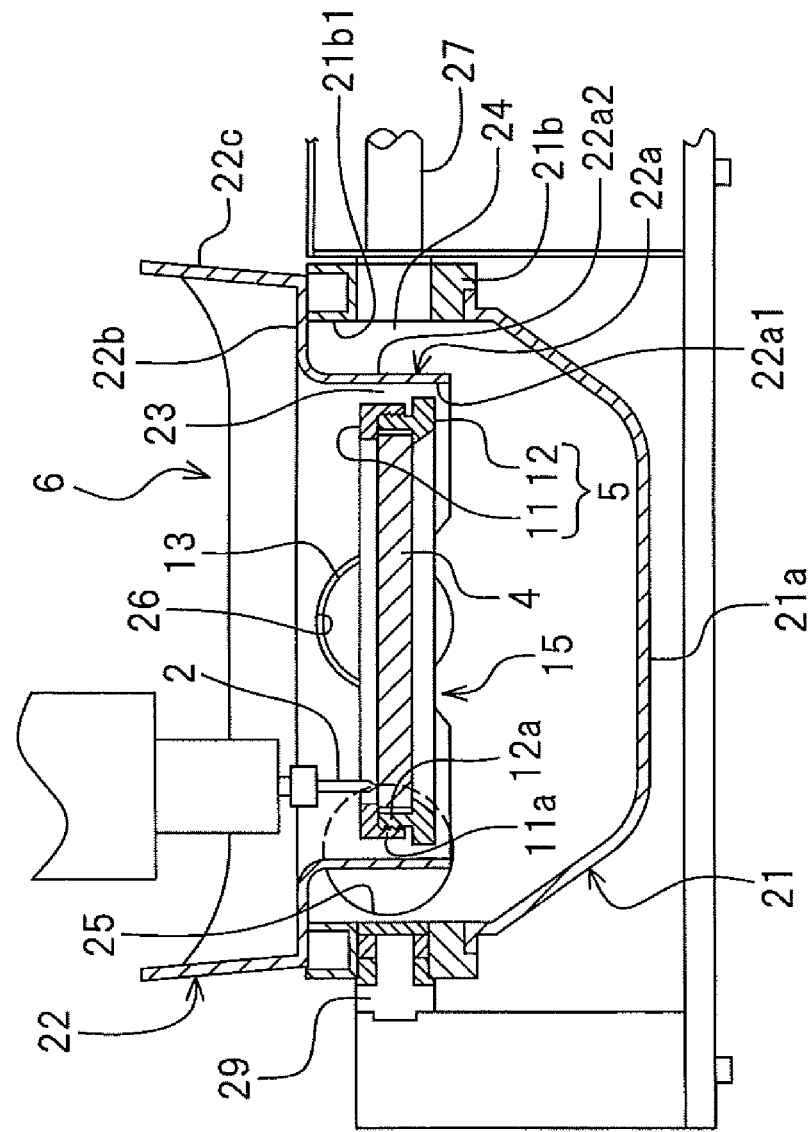
FIG. 5 is a cross-sectional view of a cutting machine along lines III-III of FIG. 4 in accordance with an embodiment of the present invention.

FIG. 4 is a plan view of a cutting machine including the work piece 4, the holder 5, and the dust collecting case 6 according to an embodiment of the invention. FIG. 5 is a cross-sectional view of a cutting machine along lines III-III of FIG. 4. As shown in FIGS. 4 and 5, the work piece 4 comprises a disk shape before processing. The holder 5, as indicated in FIG. 5, has a top ring member 11 and a bottom ring member 12. A vertical section 11a extending downward is formed on an outer circumferential section of the top ring member 11. A vertical section 12a extending upward is formed on an outer circumferential section of the bottom ring member 12.

Spiral grooves formed in an inner circumferential wall of the vertical section 11a engage with spiral grooves formed in an outer circumferential wall of the vertical section 12a. When the top ring member 11 is rotated relative to the bottom ring member 12, the top ring member 11 moves closer to, or away from, the bottom ring member 12. In order to hold the work piece 4 in place, an outer circumferential section of the work piece 4 is interposed between the top ring member 11 and the bottom ring member 12. When the top ring member 11 is rotated relative to the bottom ring member 12, the work piece 4 is gripped between the top ring member 11 and the bottom ring member 12 and consequently retained by the holder 5.

Referring to FIG. 4, a first horizontal rotary shaft 13 is fixed to the holder 5. A motor 14 is operationally coupled to the first horizontal rotary shaft 13. When the motor 14 is driven, the first horizontal rotary shaft 13 rotates which causes the holder 5 fixed to the first horizontal rotary shaft 13 to also rotate. As the holder 5 turns, the orientation of the work piece 4 changes. In this way, the work piece 4 may be tilted laterally or turned over in the cutting machine 1. The contact angle of the tool 2 relative to the work piece 4 is therefore adjustable allowing both a front surface and a back surface of the work piece 4 to be processed.

The dust collecting case 6 will now be described. Referring to FIG. 5, the dust collecting case 6 comprises an outer case member 21 and an inner case member 22 placed within the outer case member 21. The outer case member 21 and the inner case member 22 may be formed as a single piece, or formed separately and assembled to each other. In the embodiment shown in FIG. 5, the outer case member 21 and the inner case member 22 are formed separately and assembled to each other.

The outer case member 21 has a generally bowl-like shape. The outer case member 21 includes a bottom plate 21a and a first side plate 21b rising upward from the rim of the bottom plate 21a. Here, the first side plate 21b is not limited to rising upward in a strictly vertical direction, but may also rise in an upward direction tilted from a vertical direction. Moreover, although the first side plate 21b in the embodiment shown in FIG. 5 extends vertically, the first side plate 21b does not necessarily have to extend vertically. Furthermore, while the bottom plate 21a and the first side plate 21b are formed independently from one another in the embodiment shown in FIG. 5, they may be formed as a single piece in other embodiments.

The inner case member 22 has a two-step tubular shape in which a lower side has a smaller diameter than an upper side. The inner case member 22 includes a circular tube-shaped second side plate 22a, an upper plate 22b extending radially outward from an upper end of the second side plate 22a, and a third side plate 22c rising upward from an outer rim of the upper plate 22b. Alternatively, the upper plate 22b may extend from an upper end of the first side plate 21b.

Referring to FIGS. 4 and 5, in one embodiment, the upper end of the first side plate 21b and the upper end of the second side plate 22a are entirely connected with the upper plate 22b to form an enclosed surrounding. However, in an alternative embodiment, a partial cutout may be provided at the upper end of the first side plate 21b and/or the second side plate 22a.

The work piece 4 and the holder 5 are collectively referred to as a target object, or item to be processed 15. The inner case member 22 is formed with a size to allow the item to be processed 15 to be rotated within the inner case member 22. In an embodiment, an inner diameter of the second side plate 22a is formed to be larger than an outer diameter of the item to be processed 15. An inner circumferential surface 22a1 of the second side plate 22a opposes an outer circumferential section of the item to be processed 15 (outer circumferential section of the holder 5). A gap 23 exists between the inner circumferential surface 22a1 and the outer circumferential section of the item to be processed 15. Moreover, an outer circumferential surface 22a2 of the second side plate 22a opposes an inner circumferential surface 21b1 of the first side plate 21b. A gap 24 exists between the outer circumferential surface 22a2 and the inner circumferential surface 21b1.

Still referring to FIG. 5, a suction port 25 is formed on the first side plate 21b of the outer case member 21. Here, the suction port 25 is formed at a rear portion of the first side plate 21b. In FIG. 4, the rear portion of the first side plate 21b is depicted at an upper portion of the cutting machine. As shown in FIG. 4, a hose 30 is connected to the suction port 25. In an embodiment of the invention, a dust collecting device (not shown) is connected to the hose 30.

Referring to FIG. 5, the second side plate 22a of the inner case member 22 extends to a position lower than the item to be processed 15. In other words, a horizontal position of a bottom end of the second side plate 22a is lower than a horizontal position of a bottom end of the item to be processed 15. Furthermore, the horizontal position of the bottom end of the second side plate 22a is lower than a top end and center portion of the suction port 25. Also, the horizontal position of the bottom end of the second side plate 22a is at a position equivalent to a bottom end of the suction port 25. In another embodiment of the invention, the suction port 25 may be formed on the first side plate 21b of the outer case member 21 such that the horizontal position of the bottom end of the suction port 25 is lower than the horizontal position of the bottom end of the second side plate 22a.

As FIG. 5 shows, a through hole 26 is formed at rear portions of the first side plate 21b and second side plate 22a. The first horizontal rotary shaft 13 is passed through the through hole 26. In terms of lateral direction, the through hole 26 is formed at central portions of the first side plate 21b and the second side plate 22a. The suction port 25 is formed at a location offset to the left from the through hole 26.

A second horizontal rotary shaft 27 is fixed at a right side of the outer case member 21. A left portion of the outer case member 21 is supported in a rotatable manner by a shaft 29. Referring to FIG. 4, a motor 28 is attached to the second horizontal rotary shaft 27. The second horizontal rotary shaft 27 rotates with the drive force of the motor 28. The first horizontal rotary shaft 13 and the motor 14 are configured to be rotatable together with the outer case member 21 around the second horizontal rotary shaft 27 as the center. The inner case member 22 is attached to the outer case member 21 and therefore rotatable with the outer case member 21. Consequently, as the second horizontal rotary shaft 27 turns when driven by the motor 28, the outer case member 21, the inner case member 22, and the item to be processed 15 rotate in unison. As a result, the work piece 4 can be tilted laterally, forward and backward along with the outer case member 21 and the inner case member 22.

In an embodiment of the invention, the outer case member 21, the inner case member 22, and the item to be processed 15 are configured to be slidable at least in forward and backward directions along with the first horizontal rotary shaft 13, the motor 14, the second horizontal rotary shaft 27, and the motor 28. By combining the lateral movement of the cutting head 3 with the forward and backward movement of the item to be processed 15, the tool 2 can be moved forward, backward and laterally relative to the work piece 4, which allows all portions of the work piece 4 to be processed.

A dust collecting operation using the dust collecting case 6 in the cutting machine 1 will now be described. When the cutting machine 1 is operated, the tool 2 presses against the work piece 4 as it rotates, and the tool 2 cuts the work piece 4. Accordingly, debris, such as cutting chips, is generated around the tool 2 when the tool 2 cuts the work piece 4.

When the cutting machine 1 is operated, the dust collecting device is driven and the air inside the dust collecting case 6 is suctioned through the suction port 25. In the dust collecting case 6 according to an embodiment, the suction port 25 is formed on the outer case member 21, and the inner case member 22 includes the second side plate 22a extending vertically. For this reason, as shown schematically in FIG. 6, a downward suction force is created on the inner side of the inner case member 22, so that the air on the surface of the item to be processed 15 is suctioned downward through the gap 23.

Figure 6:
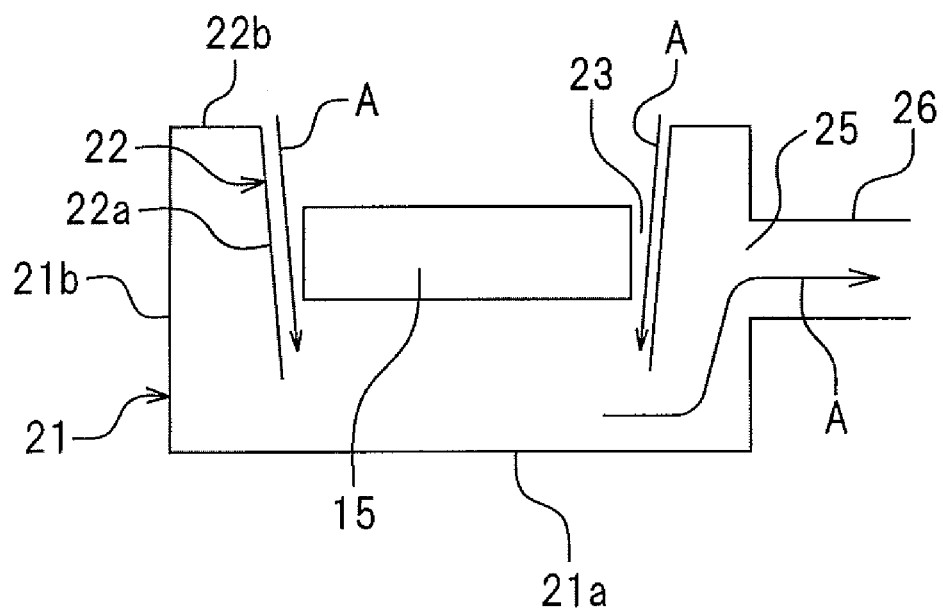
FIG. 6 is a diagram illustrating air flow in a dust collecting case in accordance with an embodiment of the present invention.

Referring to FIG. 6, "A" indicates the direction of air flow. An air flow path formed by the gap 23 is narrow, which causes the air to flow at a relatively high speed through the gap 23. Here, the second side plate 22a is formed along the entire periphery of the item to be processed 15. As such, the air flow consequently forms along the entire periphery of the item to be processed 15, which results in creating a relatively large downward suction force around the item to be processed 15.

Figure 7:
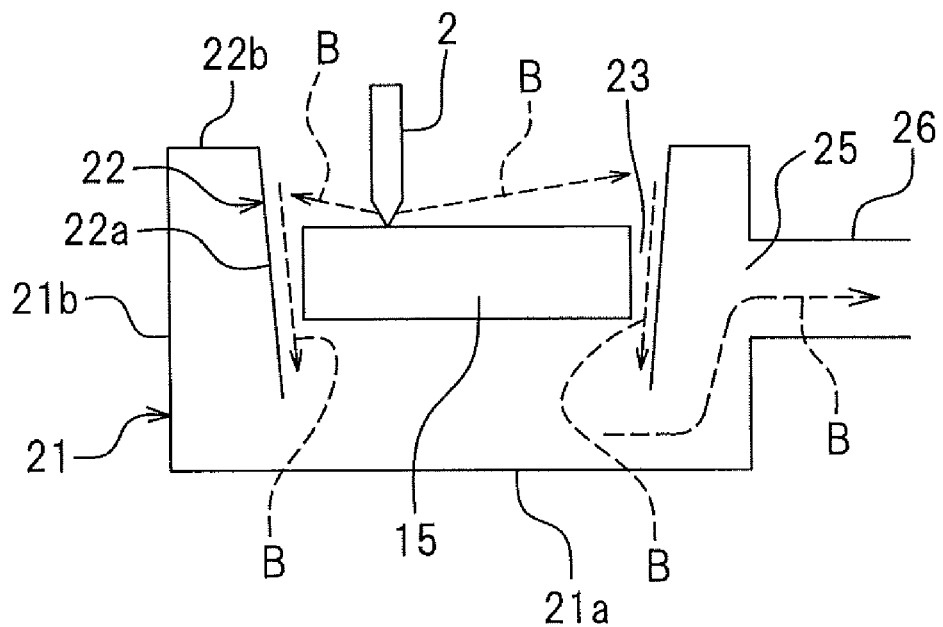
FIG. 7 is a diagram illustrating the movement of cutting chips in a dust collecting case in accordance with an embodiment of the present invention.

Cutting chips tend to scatter around the tool 2. As shown schematically in FIG. 7, cutting chips B scattered around the tool 2 travel through the dust collecting case along the direction of air flow A (see FIG. 6). The cutting chips B are suctioned through the gap 23 towards the bottom plate 21a of the outer case member 21. The cutting chips B suctioned towards the bottom plate 21a then travel upward along the direction of air flow A (see FIG. 6) towards the suction port 25 from the bottom plate 21a and are discharged through the suction port 25.

As described above, the dust collecting case 6 according to an embodiment is provided with the outer case member 21 on which the suction port 25 is formed, and the inner case member 22 having the second side plate 22a extending vertically on the inner side of the outer case member 21. The inner circumferential surface 22a1 of the second side plate 22a opposes the outer circumferential section of the item to be processed 15 mediated by the prescribed gap 23 and surrounds the item to be processed 15. As a result, when air is suctioned through the suction port 25, a strong downward air flow A is formed near the outer circumferential section of the item to be processed 15 and along the entire periphery of the item to be processed 15 (see FIG. 6).

Figure 1:
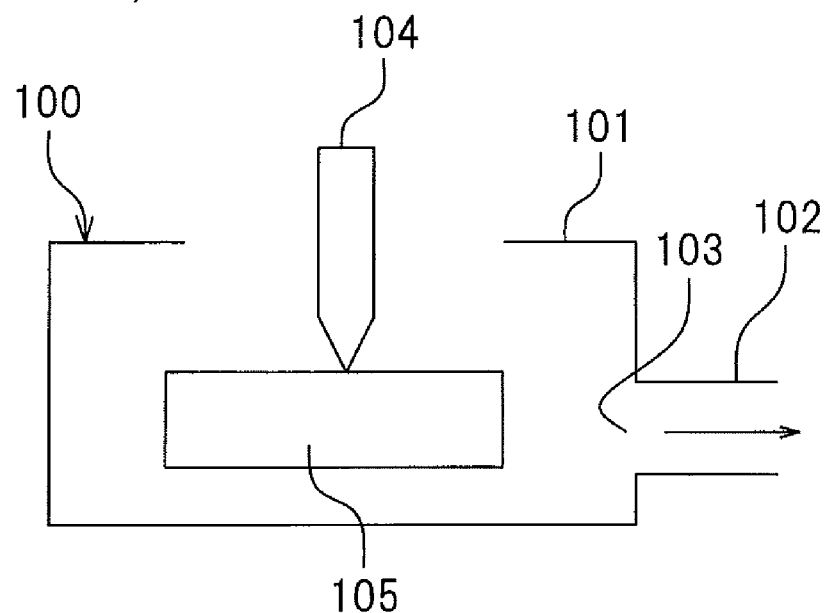
FIG. 1 is a schematic cross-sectional view of a conventional dust collecting case.
Figure 2:
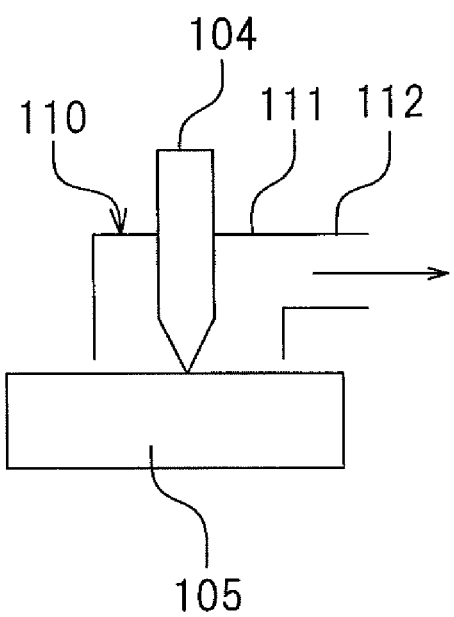
FIG. 2 is a schematic cross-sectional view of another conventional dust collecting case.

The cutting chips B generated from cutting the work piece 4 travel through the dust collecting case 6 along the direction of air flow A and are suctioned towards the bottom plate 21a of the outer case member 21. The cutting chips B then become discharged through the suction port 25 as they travel along the direction of air flow A from the bottom plate 21a towards the suction port 25 (see FIG. 5). Accordingly, with the dust collecting case 6, the cutting chips can be suctioned from the entire periphery of the item to be processed 15, such that the cutting chips can be effectively suctioned and removed regardless of which part of the work piece 4 the tool 2 is cutting. Even cutting chips generated at locations away from the suction port 25 can be fully suctioned and removed. Furthermore, unlike conventional dust collecting cases that cover only the periphery of the tool 2 (see FIG. 2), the tool 2 of the present invention is unlikely to interfere with the dust collecting case 6.

Moreover, according to an embodiment of the dust collecting case 6, the position of the bottom end of the second side plate 22a is lower than the position of the bottom end of the item to be processed 15. For this reason, the flow of air A that flows downward through the gap 23, and then flows upward towards the suction port 25, can be favorably formed. According to an embodiment, an even air flow towards the suction port 25 can be formed. As a result, cutting chips can be effectively suctioned and removed.

According to an embodiment of the dust collecting case 6, the suction port 25 is formed on the first side plate 21b. Also, the position of the bottom end of the second side plate 22a is lower than the position of the top end of the suction port 25. The air flow can therefore be formed favorably and cutting chips can be more effectively suctioned and removed. In this embodiment particularly, the position of the bottom end of the second side plate 22a is lower than a center portion of the suction port 25 and virtually equivalent to the position of the bottom end of the suction port 25. As a result, the air flow towards the suction port 25 is more even and cutting chips can be more effectively suctioned and removed.

According to an embodiment of the dust collecting case 6, the inner case member 22 has the third side plate 22c rising upward from the outer rim of the top plate 22b. Thus, an air flow can be formed from the inner circumference surface of the third side plate 22c to the gap 23 by way of the surface of the top plate 22b. This prevents cutting chips from scattering outside the dust collecting case 6 with greater assurance and more effectively suctions and removes the cutting chips.

According to an embodiment of the dust collecting case 6, although the suction port 25 is formed on the first side plate 21b, the suction port 25 is formed at a position offset from the through hole 26 and the second horizontal rotary shaft 27. For this reason, cutting chips can be smoothly suctioned and removed without any hindrance by the first horizontal rotary shaft 13 or the second horizontal rotary shaft 27.

According to an embodiment of the dust collecting case 6, unlike conventional dust collecting cases that cover only the periphery of the tool 2 (see FIG. 2), cutting performed by the tool 2 can be easily observed by a user from the outside of the dust collecting case 6.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A dust collecting case provided on a cutting machine for performing cutting work on a target object, the dust collecting case comprising:
    an outer case member including a bottom plate, a first side member extending from a peripheral edge of the bottom plate, and a suction port connected to a dust collecting device; and
    an inner case member including a second side member positioned inside the first side member,
    wherein the second side member includes an inner peripheral surface that faces and surrounds an outer periphery of the target object,
    wherein a gap is located between an outer surface of the second side member and an inner surface of the first side member, and
    wherein the target object comprises a work piece to be cut and a holder to retain the work piece.

2. The dust collecting case of claim 1, wherein the second side member comprises a tubular shape.

3. The dust collecting case of claim 1, further comprising an upper member provided between an upper portion of the first side member and an upper portion of the second side member such that the upper member closes a space formed by the first side member and the second side member.

4. The dust collecting case of claim 1, wherein a horizontal position of a lower end of the second side member is lower than a horizontal position of a lower end of the target object.

5. The dust collecting case of claim 1, wherein the suction port is formed in the first side member and a horizontal position of a lower end of the second side member is lower than a horizontal position of an upper portion of the suction port.

6. The dust collection case of claim 3, wherein the inner case member includes a third side member rising upward from an outer periphery of the upper member.

7. The dust collecting case of claim 1, wherein the first side member and the second side member define a through-hole for passing a first horizontal rotary shaft that rotatably supports the holder.

8. The dust collecting case of claim 7, wherein the suction port is formed at a position offset from the through-hole in the first side member.

9. The dust collecting case of claim 7, wherein a second horizontal rotary shaft is attached to the outer case member, the second horizontal rotary shaft extending in a direction orthogonal to the first horizontal rotary shaft.

10. The dust collecting case of claim 9, wherein the suction port is formed at a position offset from the second horizontal rotary shaft in the first side member.

11. A cutting machine for performing work on a work piece, the cutting machine comprising:
    a cutting tool cutting the work piece;
    a cutting head driving the cutting tool;
    a holder holding the work piece;
    a dust collecting case covering bottom and side surfaces of the work piece and the holder; and
    a main body case housing the cutting tool, the cutting head, the holder, the work piece and the dust collecting case,
    wherein the dust collecting case comprises:
    an outer case member including a bottom plate, a first side member extending from a peripheral edge of the bottom plate, and a suction port connected to a dust collecting device, and
    an inner case member including a second side member positioned inside the first side member, wherein the second side member includes an inner peripheral surface that faces and surrounds an outer periphery of a target object, the target object comprising the holder and the work piece, wherein a gap is located between an outer surface of the second side member and an inner surface of the first side member, and wherein the second side member comprises a tubular shape.

12. The cutting machine of claim 11, wherein the dust collecting case further comprises an upper member provided between an upper portion of the first side member and an upper portion of the second side member such that the upper member closes a space formed by the first side member and the second side member.

13. The cutting machine of claim 11, wherein a horizontal position of a lower end of the second side member is lower than a horizontal position of a lower end of the target object.

14. The cutting machine of claim 11, wherein the suction port is formed in the first side member and a horizontal position of a lower end of the second side member is lower than a horizontal position of an upper portion of the suction port.

15. The cutting machine of claim 12, wherein the inner case member includes a third side member rising upward from an outer periphery of the upper member.

16. The cutting machine of claim 11, wherein the first side member and the second side member define a through-hole for passing a first horizontal rotary shaft that rotatably supports the holder.

17. The cutting machine of claim 16, wherein the suction port is formed at a position offset from the through-hole in the first side member.

18. The cutting machine of claim 16, wherein a second horizontal rotary shaft is attached to the outer case member, the second horizontal rotary shaft extending in a direction orthogonal to the first horizontal rotary shaft.

19. The cutting machine of claim 18, wherein the suction port is formed at a position offset from the second horizontal rotary shaft in the first side member.

* * * * *